United States Patent
Kapale et al.

(10) Patent No.: US 9,896,981 B2
(45) Date of Patent: Feb. 20, 2018

(54) EXHAUST ELBOW COMPONENT WITH INTEGRATED MOUNT

(71) Applicant: Cummins Emission Solutions, Inc., Columbus, IN (US)

(72) Inventors: Yogita I. Kapale, Pune (IN); Yogesh Vasantrao Birari, Pune (IN); Shafeeq K P, Pune (IN); Aalok Trivedi, Columbus, IN (US); Lauren Alicia Hurlbut, Columbus, IN (US); Prakash Pirane, Pune (IN); Keerti Tiwari, Kanpur (IN)

(73) Assignee: CUMMINS EMISSION SOLUTIONS, INC., Columbus, IN (US)

( * ) Notice: Subject to any disclaimer, the term of this patent is extended or adjusted under 35 U.S.C. 154(b) by 0 days.

(21) Appl. No.: 14/561,832

(22) Filed: Dec. 5, 2014

(65) Prior Publication Data

US 2016/0160735 A1    Jun. 9, 2016

(51) Int. Cl.
*F01N 13/18*    (2010.01)
*F01N 3/20*    (2006.01)

(52) U.S. Cl.
CPC ....... *F01N 3/2066* (2013.01); *F01N 13/1855* (2013.01); *F01N 13/1861* (2013.01); *F01N 2260/02* (2013.01); *F01N 2610/02* (2013.01); *F01N 2610/1453* (2013.01); *Y02T 10/24* (2013.01)

(58) Field of Classification Search
CPC ...... F02D 41/029; F01N 9/002; F01N 3/0842; F01N 3/035; F01N 13/02

USPC .................. 60/274, 283, 295, 301
See application file for complete search history.

(56) References Cited

U.S. PATENT DOCUMENTS

| | | | |
|---|---|---|---|
| 2007/0283687 A1* | 12/2007 | Host | F01N 3/2892 60/302 |
| 2010/0024406 A1* | 2/2010 | Pollitt | F01N 3/2066 60/310 |
| 2010/0107614 A1* | 5/2010 | Levin | B01F 3/04049 60/303 |
| 2010/0212292 A1* | 8/2010 | Rusch | F01N 3/2066 60/274 |
| 2011/0099974 A1* | 5/2011 | Griffin | F01N 3/2066 60/274 |
| 2012/0324872 A1 | 12/2012 | Jaruvatee et al. | |

(Continued)

*Primary Examiner* — Patrick Maines
(74) *Attorney, Agent, or Firm* — Foley & Lardner LLP

(57) ABSTRACT

An exhaust elbow component may be located upstream of a decomposition reactor pipe and/or may be integrated with decomposition reactor pipe. The exhaust elbow component includes a mounting area for mounting a dosing module to the exhaust elbow component. The mounting area may be configured to limit the heat transfer from the elbow component to the dosing module via the mounting area. The mounting area may include a boss and one or more mounting legs. The one or more legs and/or the boss may have a surface area for convective cooling of the mounting area. The boss may include an opening through an exterior wall of the exhaust elbow component through which an injection tip of the dosing module may dose reductant into an interior chamber of the exhaust elbow. A central axis of the opening may be substantially coaxial with a central axis of the exhaust gas outlet.

20 Claims, 7 Drawing Sheets

(56) References Cited

U.S. PATENT DOCUMENTS

| | | | |
|---|---|---|---|
| 2013/0164181 A1* | 6/2013 | Iijima | F01N 3/2066 422/169 |
| 2013/0164182 A1* | 6/2013 | Iijima | B01F 5/0473 422/169 |
| 2013/0164183 A1* | 6/2013 | Iijima | B01D 53/9431 422/170 |
| 2013/0219871 A1* | 8/2013 | Crandell | F01N 3/2066 60/295 |
| 2014/0196442 A1* | 7/2014 | Katou | F01N 3/10 60/286 |
| 2014/0237998 A1* | 8/2014 | Fahrenkrug | F01N 3/2066 60/301 |
| 2015/0285200 A1* | 10/2015 | Niaz | F02M 61/14 123/470 |

* cited by examiner

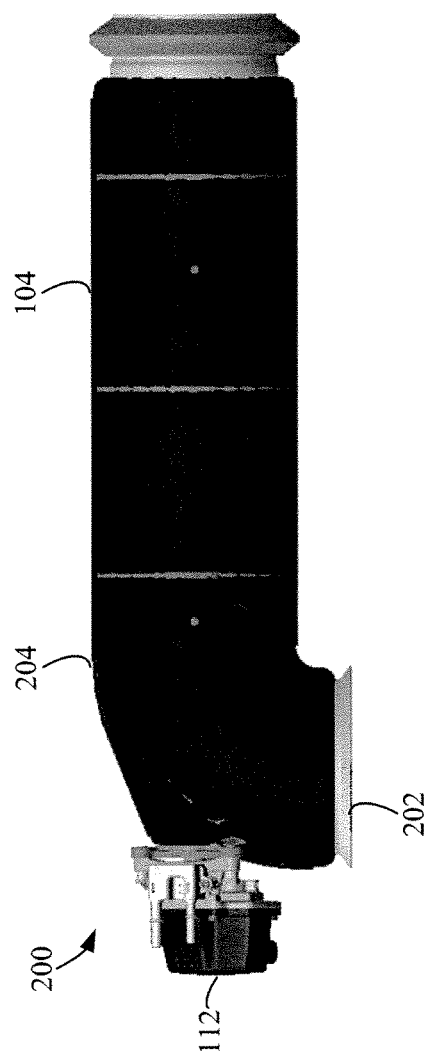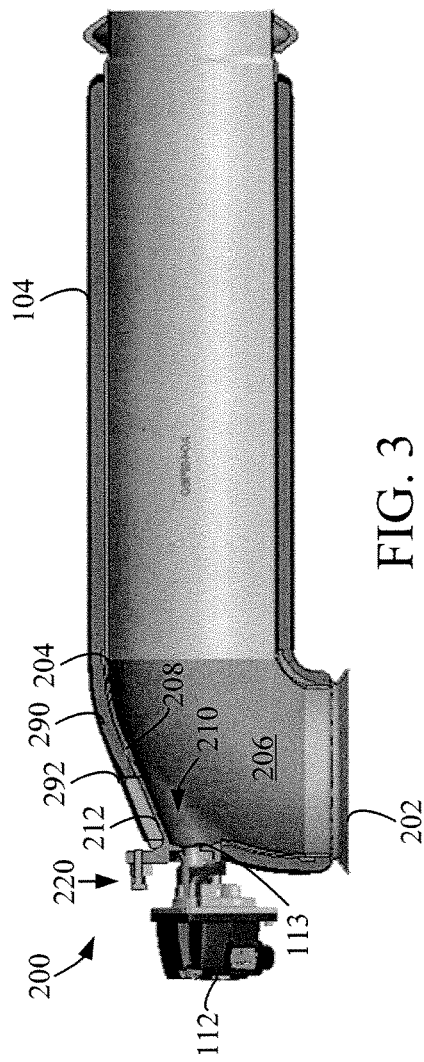

EXHAUST ELBOW COMPONENT WITH INTEGRATED MOUNT

TECHNICAL FIELD

The present application relates generally to the field of mounting systems for exhaust system components. More specifically, the present application relates to integrated mounting systems for a dosing module for an exhaust system.

BACKGROUND

Combustion engines may include exhaust systems to direct and, in some instances, treat exhaust gases emitted from the combustion engine. For instance, diesel engines may include exhaust system components to treat nitrogen oxide ($NO_x$) compounds that may be emitted in the exhaust gas from the diesel engine. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. A SCR catalyst may be included in a catalyst chamber of an exhaust system, such as that of a vehicle or power generation unit. The exhaust system may include other components for the exhaust system, such as a diesel particulate filter (DPF), a diesel oxidation catalyst (DOC), or other components. A reductant such as anhydrous ammonia, aqueous ammonia, or urea is typically introduced into the exhaust gas flow prior to the catalyst chamber. To introduce the reductant into the exhaust gas flow for the SCR process, an SCR system may dose or otherwise introduce the reductant through a dosing module that vaporizes or sprays the reductant into an exhaust pipe of the exhaust system upstream of the catalyst chamber.

SUMMARY

Implementations described herein relate to an exhaust elbow component for an exhaust system that includes an inlet and an outlet oriented at ninety degrees relative to each other. The exhaust elbow component may be located upstream of a decomposition reactor pipe and/or may be integrated into the decomposition reactor pipe. The exhaust elbow component includes an integrated mounting area for mounting a dosing module to the exhaust elbow component. The mounting area may be configured to limit the heat transfer from the elbow component to the dosing module via the mounting area. That is, the mounting area may be configured to reduce heat flux to the dosing module and/or increase convective cooling to atmosphere. Such an exhaust elbow component may also assist in mitigating reductant, such as Diesel Exhaust Fluid (DEF), deposit formation in the decomposition pipe for aftertreatment systems used in vehicles or stationary combustion engines.

One implementation relates to an exhaust elbow component that includes an exhaust gas inlet configured to receive exhaust gases, an exhaust gas outlet angularly offset from the exhaust gas inlet, and an exterior wall defining an interior chamber and connecting the exhaust gas inlet and the exhaust gas outlet. The exterior wall includes a mounting area for mounting a dosing module. The mounting area includes a boss having an opening through which reductant is dosed when the dosing module is mounted to the mounting area. A central axis of the opening is substantially coaxial with a central axis of the exhaust gas outlet. The mounting area also includes one or more mounting legs each having a surface area for convective cooling of the one or more mounting legs.

Another implementation relates to an exhaust system that includes a decomposition chamber and an exhaust elbow component. The exhaust elbow component includes an exhaust gas outlet and an exhaust gas inlet. The exhaust gas outlet is in fluid communication with the decomposition chamber and the exhaust gas inlet receives exhaust gases. The exhaust elbow also includes an exterior wall defining an interior chamber and connecting the exhaust gas inlet and the exhaust gas outlet. The exterior wall includes a mounting area for mounting a dosing module. The mounting area includes an opening through which reductant is dosed when the dosing module is mounted to the mounting area. A central axis of the opening is substantially coaxial with a central axis of the exhaust gas outlet. The mounting area also includes one or more mounting legs each having a surface area for convective cooling of the one or more mounting legs.

Yet a further implementation relates to a process for assembling an exhaust system. The process includes providing an exhaust elbow component. The exhaust elbow component includes an exhaust gas inlet configured to receive exhaust gases from an upstream portion of an exhaust system. The exhaust elbow component also includes an exhaust gas outlet angularly offset from the exhaust gas inlet. The exhaust elbow component further includes an exterior wall defining an interior chamber and connecting the exhaust gas inlet and the exhaust gas outlet. The exterior wall includes a mounting area for mounting a dosing module. The mounting area includes a boss having an opening through the exterior wall through which reductant is dosed when the dosing module is mounted to the mounting area. A central axis of the opening is substantially coaxial with a central axis of the exhaust gas outlet. The mounting area also includes one or more mounting legs configured to be coupled to the dosing module. The process also includes coupling the provided exhaust elbow component to the upstream portion and a downstream portion of the exhaust system. The process further includes mounting the dosing module to the mounting area of the exhaust elbow component.

BRIEF DESCRIPTION OF THE DRAWINGS

The details of one or more implementations are set forth in the accompanying drawings and the description below. Other features, aspects, and advantages of the disclosure will become apparent from the description, the drawings, and the claims, in which:

FIG. 2 is a side elevation view of an implementation of an exhaust elbow component having a dosing module mounted thereto and a decomposition reactor pipe;

FIG. 3 is a side elevation cross-sectional view of the exhaust elbow component, dosing module, and decomposition reactor pipe of FIG. 2;

Figure 1:
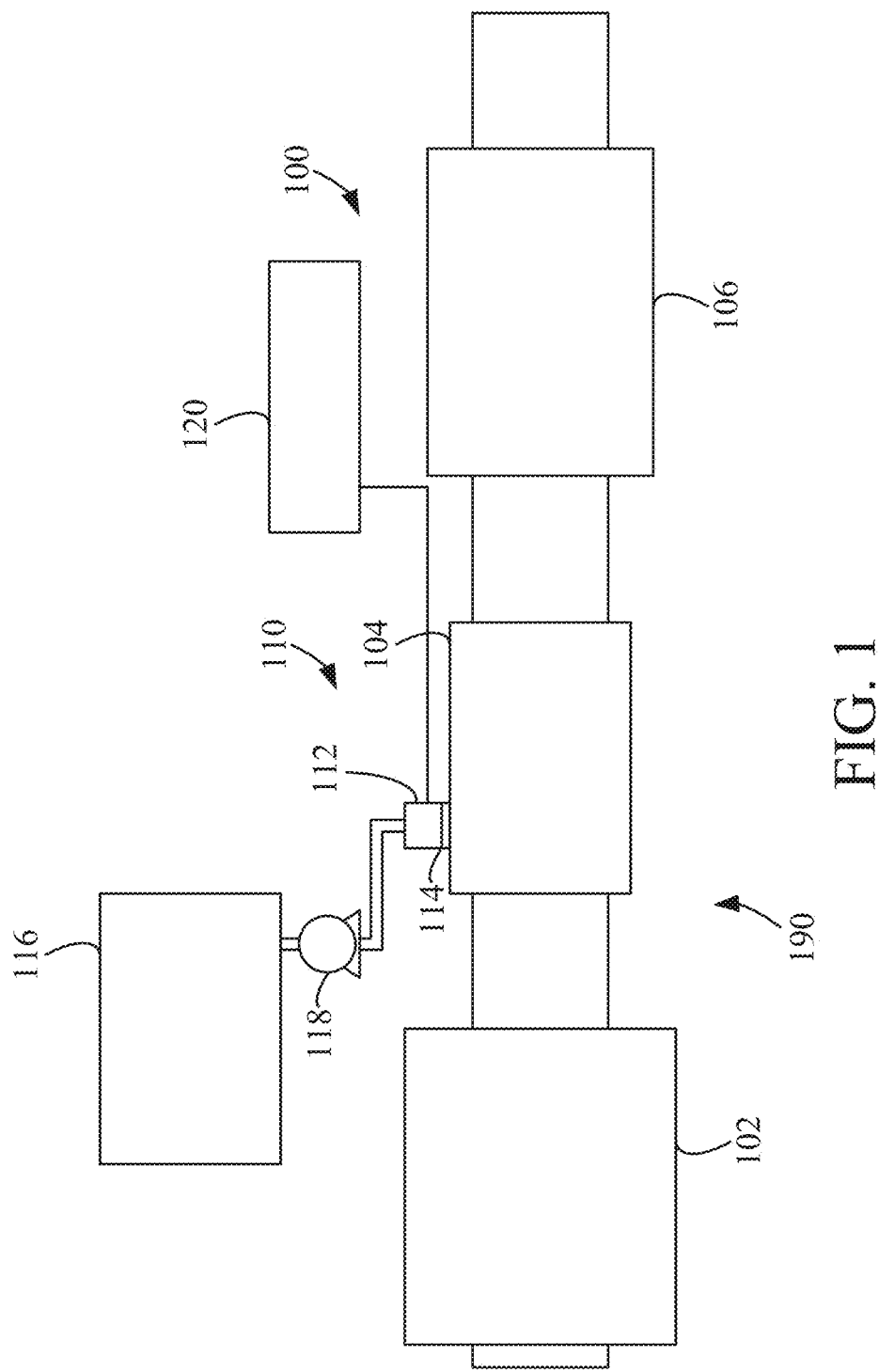
FIG. 1 is a block schematic diagram of an example selective catalytic reduction system having an example reductant delivery system for an exhaust system.

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for injecting and mixing reductant into an exhaust flow of a vehicle. The various concepts introduced above and discussed in greater detail below may be implemented in any of numerous ways, as the described concepts are not limited to any particular manner of implementation. Examples of specific implementations and applications are provided primarily for illustrative purposes.

I. Overview

In exhaust systems with SCR systems, various dosing modules and/or exhaust pipe configurations may be utilized. For instance, air-assisted or airless dosing modules may be utilized. In addition, some exhaust systems utilize various bends and straight portions of exhaust pipe for routing the exhaust system. The dosing module for an exhaust system may be positioned at various locations and/or angles to dose reductant into an exhaust system. For example, a dosing module may be positioned at an elbow portion of exhaust pipe of an exhaust system for dosing reductant into the exhaust system, such as substantially axially aligned with a downstream leg of the elbow portion. In other implementations, the dosing module may be positioned on a side of a straight portion of exhaust pipe of an exhaust system for dosing reductant into the exhaust system. In some instances, the dosing module may be angled relative to the exhaust flow at an angle that is non-parallel to the exhaust flow and/or non-perpendicular to the exhaust flow.

In some implementations, to maximize the amount of reductant that is evaporated, dosing modules with sufficient velocity to introduce the reductant into a high velocity exhaust stream may be utilized. However, in lower velocity conditions, such dosing modules may inject reductant at a high velocity such that deposit formations may form on a surface opposite the dosing module. In some implementations, coatings are applied to the sidewalls to substantially prevent or reduce build-up of deposit formations. In other implementations, a dosing module with a lower injection velocity may be utilized. However, in higher velocity exhaust flow conditions, the low velocity of the injected reductant may result in less evaporation and/or mixing of the reductant with the exhaust gases, thereby resulting in poor reductant uniformity.

To reduce the likelihood of deposit formation on surfaces of the exhaust system, the dosing module may be mounted to the exhaust system in a position such that a central axis of a cone of reductant dosed by the dosing module is substantially coaxial to a central axis of the exhaust system component into which the reductant is dosed, such as the central axis of a cylindrical decomposition reactor pipe of the exhaust system. For systems that are space constrained, an elbow component may be utilized upstream of the decomposition reactor pipe to redirect exhaust gas flow into the decomposition reactor pipe. Such an elbow component may provide for a dosing module to dose reductant such that a central axis of a cone of reductant dosed by the dosing module is substantially coaxial to a central axis of the exhaust system component into which the reductant is dosed. To dose coaxially to the central axis of the exhaust system component, such as a decomposition reactor pipe, the dosing module may be mounted to a curved section of the elbow component.

In some implementations, a mounting plate is welded to the elbow component to provide a mounting area for the dosing module. Such welded mounting plates may increase the weight of the elbow component by requiring additional material, such as metal, to be added via the weld to attach the mounting plate, thereby also increasing the cost of such a component. Moreover, the added material may increase the heat transfer from the exhaust gas flowing within the elbow component to the dosing module. Such increased heat transfer may result because of the conduction occurring through the thicker metallic connection between the mounting plate and the elbow component with less surface area for convective cooling from the atmosphere external to the elbow component. The increased heat transfer to the mounting plate results in increased heat transfer to the dosing module, which may, in some instances, overheat components of the dosing module, evaporate reductant within the dosing module before dosing, and/or other undesired results due to the increased heat transferred to the dosing module.

Accordingly, it may be useful to integrate a mounting area into the elbow component that eliminates the need to weld a mounting plate for the dosing module to the elbow component. The integration of the mounting area into the elbow component may be configured such that it is designed with minimal material, such as metal, both to withstand any required stresses for the mounting points of the dosing module and also to reduce the heat transfer conducted to mounting feet of the dosing module. The integrated mounting area may also include one or more openings, such as air pockets, at one or more positions of the mounting area where heat flux is reduced by convective cooling to atmosphere. The reduced material and omission of welding may further provide additional space between the mounting points of the mounting area and the elbow component, thereby accommodating insulation and/or heat shield material between the dosing module and the elbow component to further reduce heat transfer from the elbow component to the dosing module.

II. Overview of Aftertreatment System

FIG. 1 depicts an aftertreatment system 100 having an example reductant delivery system 110 for an exhaust system 190. The aftertreatment system 100 includes a diesel particulate filter (DPF) 102, the reductant delivery system 110, a decomposition chamber or reactor 104, and a SCR catalyst 106.

The DPF 102 is configured to remove particulate matter, such as soot, from exhaust gas flowing in the exhaust system 190. The DPF 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the SCR catalyst 106. The reductant droplets then undergo the processes of evaporation, thermolysis, and hydrolysis to form gaseous ammonia within the exhaust system 190. The decomposition chamber 104 includes an inlet in fluid communication with the DPF 102 to receive the exhaust gas containing $NO_x$ emissions and an outlet for the exhaust gas, $NO_x$ emissions, ammonia, and/or remaining reductant to flow to the SCR catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, ASIC, FPGA, etc. with program instructions. The memory may include a memory chip, Electrically Erasable Programmable Read-Only Memory (EEPROM), erasable programmable read only memory (EPROM), flash memory, or any other suitable memory from which the controller 120 can read instructions. The instructions may include code from any suitable programming language.

The SCR catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The SCR catalyst 106 includes inlet in fluid communication with the decomposition chamber 104 from which exhaust gas and reductant is received and an outlet in fluid communication with an end of the exhaust system 190.

The exhaust system 190 may further include a diesel oxidation catalyst (DOC) in fluid communication with the exhaust system 190 (e.g., downstream of the SCR catalyst 106 or upstream of the DPF 102) to oxidize hydrocarbons and carbon monoxide in the exhaust gas.

In some implementations, the DPF 102 may be positioned downstream of the decomposition chamber or reactor pipe 104. For instance, the DPF 102 and the SCR catalyst 106 may be combined into a single unit, such as an SDPF. In some implementations, the dosing module 112 may instead be positioned downstream of a turbocharger or upstream of a turbocharger.

III. Implementation of an Exhaust Elbow Component Having an Integrated Mount

FIGS. 2-7 depict an implementation of an exhaust elbow component 200 for an exhaust system, such as exhaust system 190 of FIG. 1. The exhaust elbow component 200 may be a separate component from a decomposition chamber or reactor pipe 104 or may be integrated into the decomposition chamber or reactor pipe 104.

Figure 4:
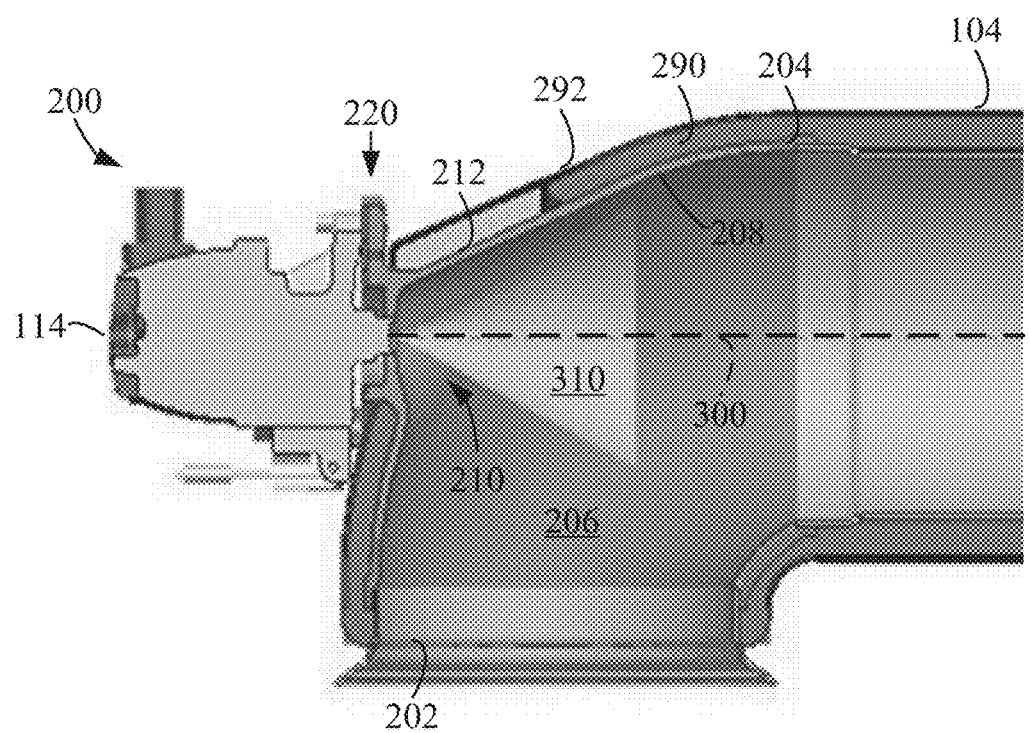
FIG. 4 is a partial side elevation cross-sectional view of the exhaust elbow component having the dosing module mounted thereto of FIG. 3 and showing a cone of reductant being dosed into the exhaust elbow component.

FIGS. 2-4 depict the exhaust elbow component 200 coupled to a decomposition chamber 104 and having a dosing module 112 mounted to the exhaust elbow component 200. The exhaust elbow component 200 includes an exhaust gas inlet 202 and an exhaust gas outlet 204. The exhaust gas inlet 202 receives exhaust gases from a combustion engine, such as a diesel engine, and redirects the exhaust gases at an angle, such as ninety degrees, towards the exhaust gas outlet 204. The exhaust gas outlet 204 may be angularly offset by an angle relative to the exhaust gas inlet 202, such as 0 degrees to 180 degrees. In some implementations, intervening exhaust system components or other components, such as one or more turbochargers or diesel particulate filters, may be interposed between the combustion engine and the exhaust gas inlet 202. The exhaust gas inlet 202 is configured to be coupled to another exhaust system component, such as an exhaust pipe or diesel particulate filter, to fluidly couple the exhaust gas inlet 202 to the other exhaust system component.

The exhaust gas outlet 204 is fluidly coupled to a downstream component of the exhaust system, such as the decomposition chamber 104, to transfer exhaust gas to the downstream component or components. In some implementations, the exhaust gas inlet 202 and exhaust gas outlet 204 may each have a diameter of approximately 127.75 millimeters (mm).

The exhaust elbow component 200 includes an interior chamber 206 defined by an exterior wall 208 that connects the exhaust gas inlet 202 and the exhaust gas outlet 204. The exterior wall 208 and interior chamber 206 may be cylindrical in cross-section and form a ninety degree elbow tubular bend. In other implementations, the exterior wall 208 and the interior chamber 206 may form other angular degree changes from the exhaust gas inlet 202 to the exhaust gas outlet 204, such as from 0 degrees to 180 digress. In some implementations, the exterior wall 208 and interior chamber 206 may have other cross-sectional profiles, such as ovular, rectangular, triangular, hexagonal, pentagonal, etc. The exterior wall 208 also defines an internal cavity 210 at an exterior portion of the exterior wall 208. The internal cavity 210 is a chamber into which reductant from the dosing module 112 may be sprayed such that a central axis 300 of a cone of reductant 310 is coaxial with a central axis of the exhaust gas outlet 204 and/or of the decomposition chamber 104, as shown best in FIG. 3. The internal cavity 210 may be defined by a semi-conic protrusion 212 extending from the exterior portion of the exterior wall 208.

The internal cavity 210 may be configured to substantially reduce and/or eliminate exhaust gas recirculation substantially near or at an injection tip 113 of the dosing module 112. That is, as exhaust gas flows into the exhaust elbow component 200 via the exhaust gas inlet 202, the exhaust gases are redirected by the curvature of the exterior wall 208 and the configuration of the semi-conic protrusion 212 toward the exhaust gas outlet 204 and/or the decomposition chamber 104 without forming substantial eddies or other recirculation patterns within the internal cavity 210. Thus, when reductant is dosed into the interior chamber 206 of the exhaust elbow component 200, the exhaust gases mix with and transport the reductant away from the injection tip 113 of the dosing module 112, thereby reducing and/or substantially preventing formation of deposits in the internal cavity 210, the injection tip 113, and/or the dosing module 112.

Figure 5:
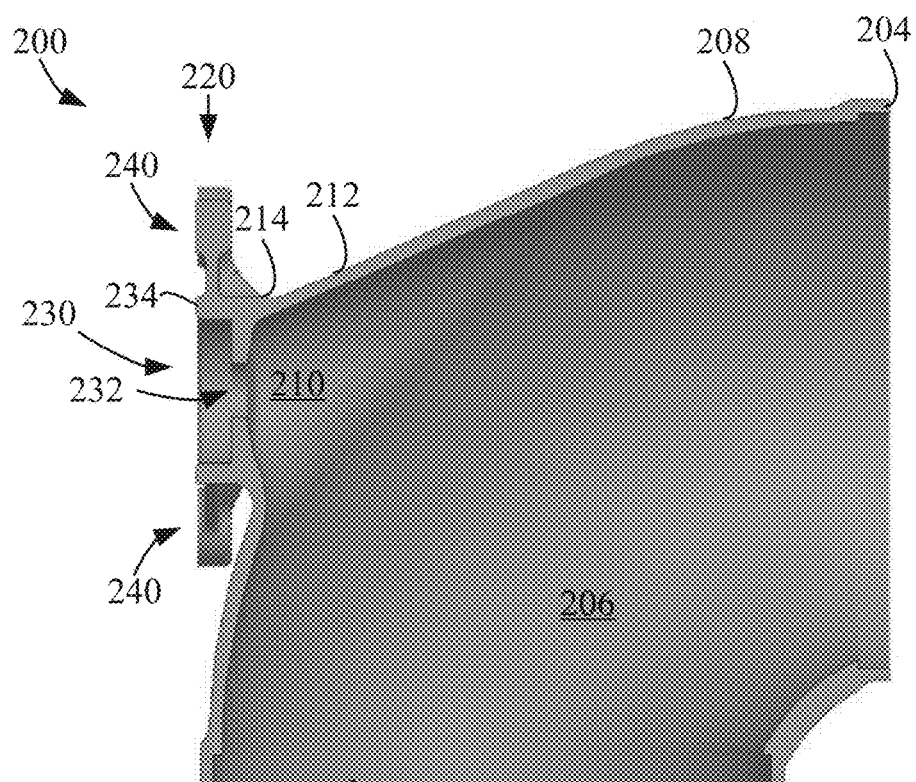
FIG. 5 is a side elevation cross-sectional view of the exhaust elbow component of FIG. 2.
Figure 6:
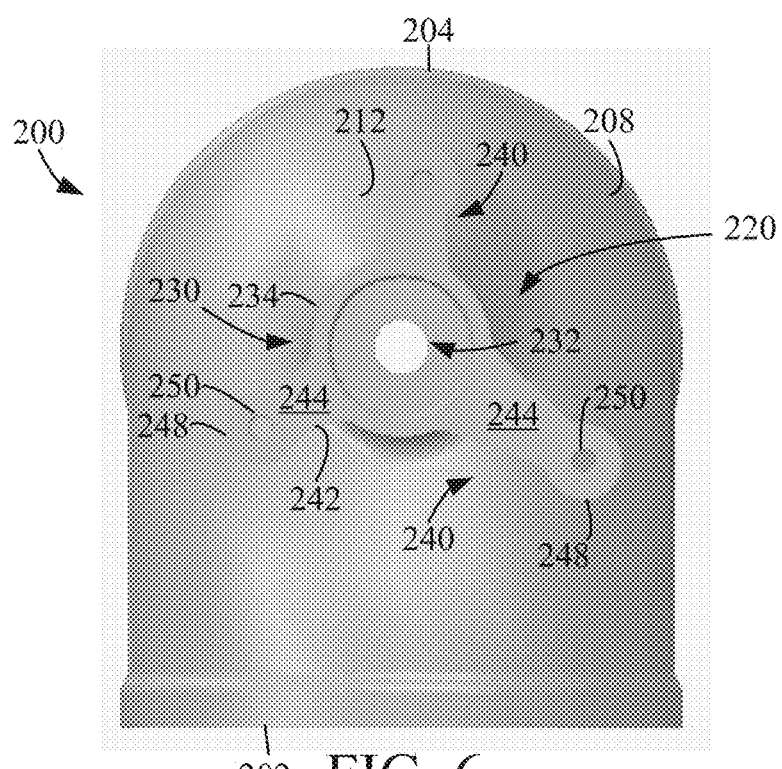
FIG. 6 is a rear elevation view of the exhaust elbow component of FIG. 2.
Figure 7:
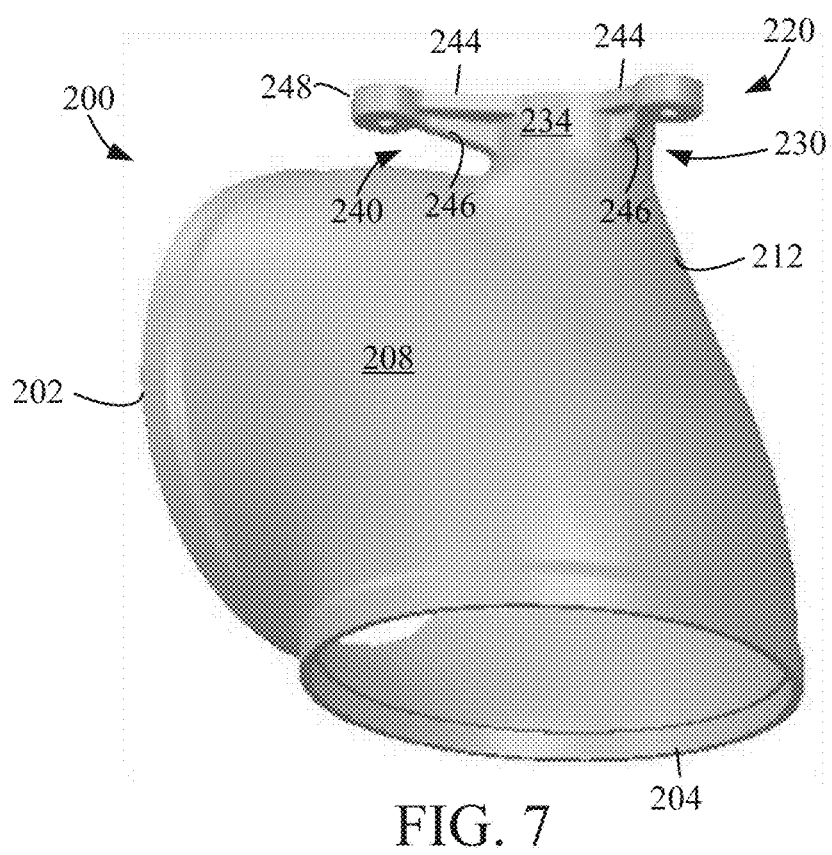
FIG. 7 is a perspective view of the exhaust elbow component of FIG. 2.

Referring to FIGS. 5-7, an end 214 of the semi-conic protrusion 212 includes a mounting area 220 for mounting a dosing module 112 to the exhaust elbow component 200. The mounting area 220 includes a boss 230 and one or more mounting legs 240. The boss 230 includes an opening 232 through which reductant may be dosed into the internal cavity 210 and interior chamber 206 of the exhaust elbow component 200 from an injection tip 113 of a dosing module 112. In some implementations, the opening 232 may be positioned such that the injection tip 113 of the dosing module 112 extends through the opening 232 and into the internal cavity 210. In other implementations, the opening 232 may be positioned such that the injection tip 113 of the dosing module 112 is substantially aligned with a surface surrounding the opening 232, such as an interior or exterior surface surrounding the opening 232. In still other implementations, the opening 232 may be positioned such that the injection tip 113 of the dosing module 112 is positioned outside of the opening 232 and sprays reductant through the opening 232. In some implementations, the opening 232 may be 12.7 mm in diameter to accommodate an injection tip 113. A central axis of the opening may be substantially coaxial with the central axis of the exhaust gas outlet 204 and/or decomposition chamber 104 such that, the central axis 300 of a cone of dosed reductant 310 is coaxial with a central axis of the exhaust gas outlet 204 and/or of the decomposition chamber 104. As used herein "substantially coaxial" should be understood to not require that the opening be precisely coaxial with the central axis of the exhaust gas outlet, but rather permits a small range of regularly recognized manufacturing tolerances as known in the art. In one implementation, this may constitute a potential variance of about five degrees.

The boss 230 also includes a body portion 234 that abuts a portion of the dosing module 112 to accommodate, seal, and support the positioning of the injection tip 113 of the dosing module 112 relative to the opening 232. In the implementation shown, the body portion 234 includes a cylindrical protrusion with a hollow interior to accommodate the positioning of the injection tip 113 of the dosing module 112 relative to the opening 232. In other implementations, the body portion 234 may have other configurations (e.g., square, triangular, hexagonal, pentagonal, etc.). In some implementations, the inner diameter of the body portion 234 may be 33 mm in diameter to accommodate the injection tip 113 and/or other portions of the dosing module 112. When the dosing module 112 is coupled to the mounting area 220, the abutment of the body portion 234 of the boss 230 to the dosing module 112 may form a fluid seal to substantially prevent exhaust gas and/or reductant within the exhaust elbow component 200 from escaping to atmosphere. In some implementations, a gasket or other seal may be interposed between the dosing module 112 and the body portion 234.

The mounting area 220 also includes one or more mounting legs 240. The mounting legs 240 extend from the body portion 234 of the boss 230. In other implementations, the mounting legs 240 may extend from the exterior wall 208 independent of the boss 230. In the implementation shown, three mounting legs 240 extend from the boss 230 to attach to three mounting points of a dosing module 112. In other implementations, more than three or less than three mounting legs 240 may extend from the boss 230 to attach respective mounting points of the dosing module 112. The mounting legs 240 include a leg body portion 242 and a mounting portion 248. The leg body portion 242 of each mounting leg 240 has a T-shaped cross-section formed by an upper portion 244 and a rib portion 246. In the implementation shown, the exterior sides of the upper portion 244 taper from a first end extending from the boss 230 toward a second end where the mounting portion 248 is located. As also shown in the current implementation, the rib portion 246 tapers from a first end extending from the boss 230 toward a second end where the mounting portion 248 is located. The mounting portion 248 is a cylindrical member having an attachment opening 250 formed therethrough. The attachment opening 250 is sized to permit an attachment member, such as a bolt, to extend through the mounting portion 248 to couple the dosing module 112 to the mounting area 220. In some implementations, the attachment opening 250 may be threaded to threadably coupled the attachment member to the mounting portion 248. In other implementations, the mounting portion 248 may be a square member, a rectangular member, a hexagonal member, a pentagonal member, an oval member, etc.

The configuration and spacing of the mounting legs 240 permits convective cooling of the mounting area 220 via exposure of a large surface area of the mounting area 220 to atmosphere. Thus, although conductive heat transfer occurs from the exhaust gases traveling within the exhaust elbow component 200 to the exterior wall 208 (and thus the mounting area 220 via conduction), the exposure of the surface areas of the boss 230 and mounting legs 240 permits the atmospheric air to cool the mounting area 220, thereby reducing the heat transfer to the dosing module 112 mounted to the mounting area 220. Moreover, when the dosing module 112 is coupled to the mounting area 220 via the mounting portions 248 of the mounting legs 240, the mounting area 220 of the present implementation permits the injection tip of the dosing module 112 to inject reductant such that the central axis 300 of the cone of reductant 310 is coaxial with the central axis of the exhaust gas outlet 204 and/or of the decomposition chamber 104, as shown in FIG. 3. Accordingly, the configuration of the exhaust elbow component 200 reduces heat transfer to the dosing module 112, secures the dosing module 112 to the exhaust elbow component 200, and allows the dosing module 112 to inject a cone of reductant 310 to be coaxial with the central axis of the exhaust gas outlet 204 and/or of the decomposition chamber 104, thereby enhancing mixing and uniformity of the injected reductant while reducing the formation of deposits on the interior of the exhaust elbow component 200 and/or the decomposition chamber 104.

In some implementations, an insulating material 290 and/or heat shield 292 may be disposed about a portion of the exterior wall 208. In some instances, the insulating material 290 and/or heat shield 292 may be positioned between the mounting legs 240 and the exterior wall 208 of the exhaust elbow component 200 and/or other portions of the exhaust elbow component 200. For instance, an insulating material 292 and heat shield 292 may substantially surround an outer surface of the exterior wall 208 of the exhaust elbow component 200 while permitting the mounting area 220 with the boss 230 and mounting legs 240 to extend out from an opening in the insulating material 290 and heat shield 292. In some implementations, the insulating material 290 and/or heat shield 292 may be disposed about the exterior surface of the exterior wall 208 except where the boss 230 protrudes from the exterior wall 208. Thus, the insulating material 290 and/or heat shield 292 may further reduce the convective heat transfer from the exterior wall 208 to atmosphere, thereby further reducing convective heat transfer to the dosing module 112 and/or permitting cooler atmospheric air to convectively cool the mounting area 220.

In some implementations, the exhaust elbow component 200 may be a single homogeneous continuum of material, such as a cast component. For instance, the exhaust elbow component 200 may be cast stainless steel (such as Cast CB30 stainless steel), cast iron, or any other suitable material to withstand the temperatures of an exhaust gas from a combustion engine, such as a diesel engine.

Figure 8:
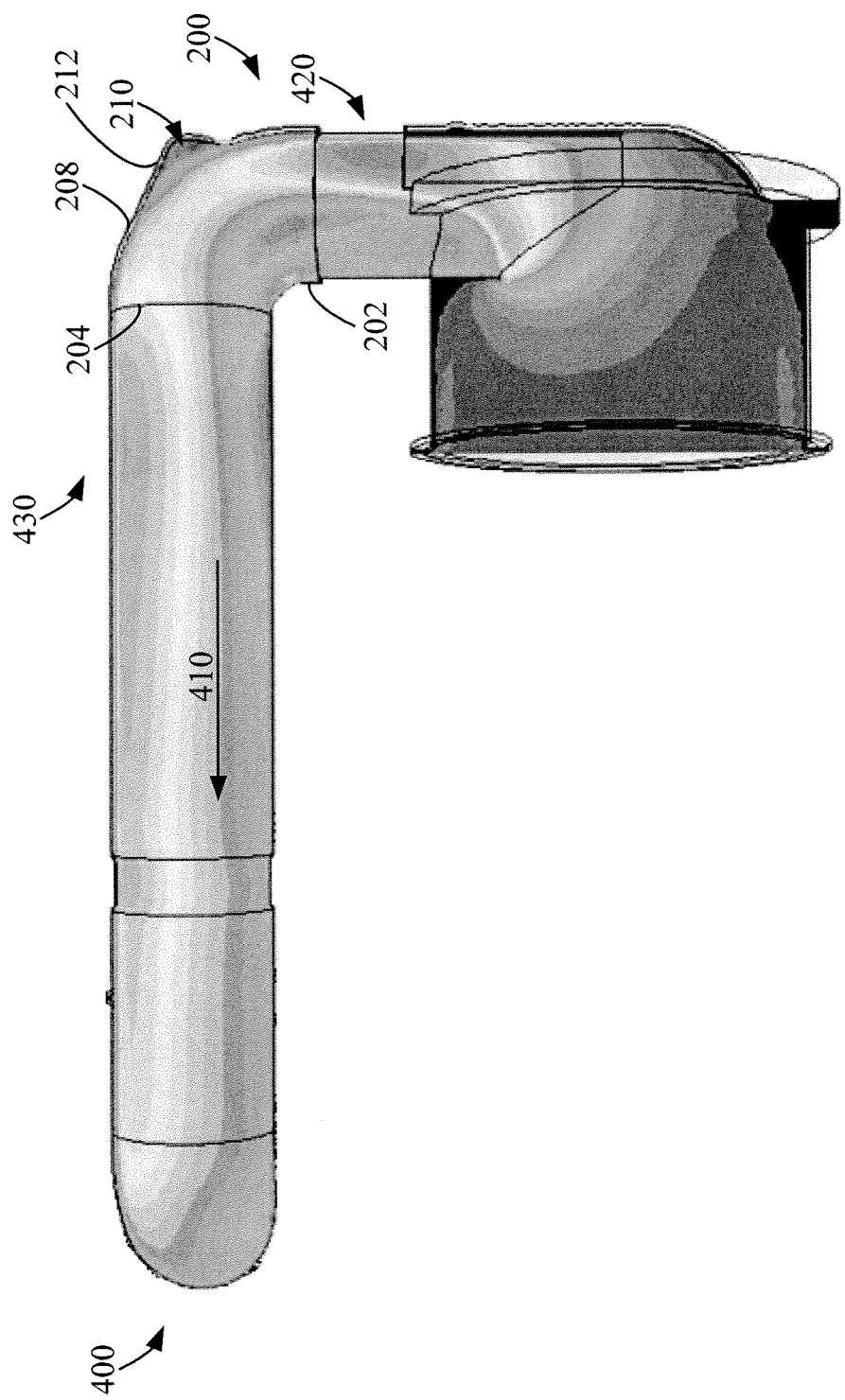
FIG. 8 is a graphical view depicting an exhaust flow velocity contour gradient profile of an exhaust system having the exhaust elbow component of FIG. 2.

FIG. 8 depicts an exhaust flow velocity profile 400 flowing in the direction of arrow 410 for an exhaust system having the exhaust elbow component 200. As shown, the exhaust gases are redirected ninety degrees from the exhaust gas inlet 202 to the exhaust gas outlet 204. As shown by the exhaust flow velocity profile 400, when exhaust gas flows into the exhaust elbow component 200 via the exhaust gas inlet 202, the exhaust gases are redirected by the curvature of the exterior wall 208 and the configuration of the semiconic protrusion 212 toward the exhaust gas outlet 204 and/or the decomposition chamber 104 without forming substantial eddies or other recirculation patterns within the internal cavity 210. Thus, when reductant is dosed into the interior chamber 206 via a dosing module 112 mounted to the mounting area 220 of the exhaust elbow component 200, the exhaust gases mix with and transport the reductant away from the injection tip of the dosing module 112, thereby reducing and/or substantially preventing formation of deposits in the internal cavity 210, the injection tip, and/or the dosing module 112.

Figure 9B:
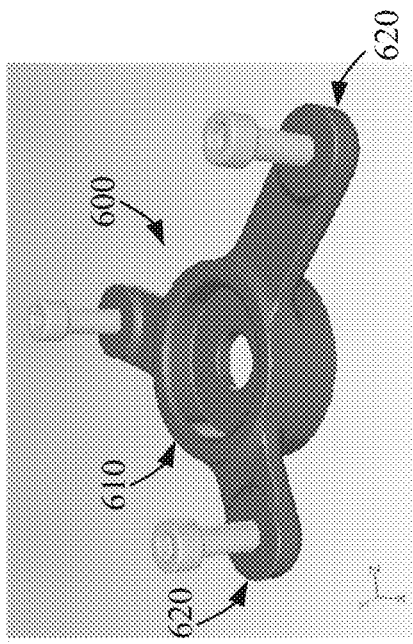
FIG. 9B is a perspective view of yet another implementation of a mounting area for an exhaust elbow component without openings through the legs.
Figure 9A:
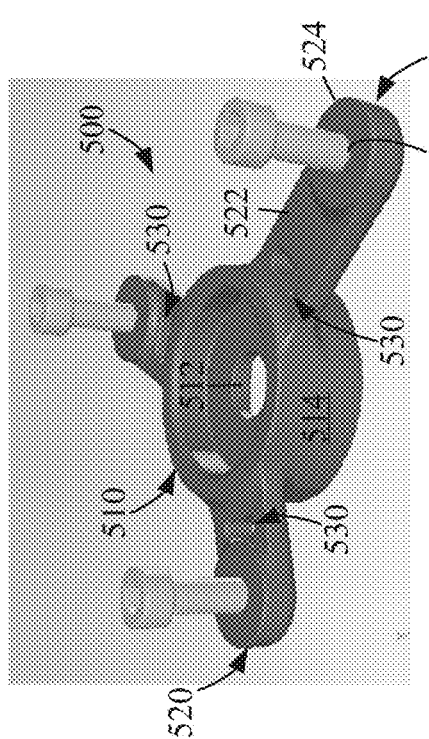
FIG. 9A is a perspective view of an implementation of a mounting area for an exhaust elbow component having openings through the legs.
Figure 9C:
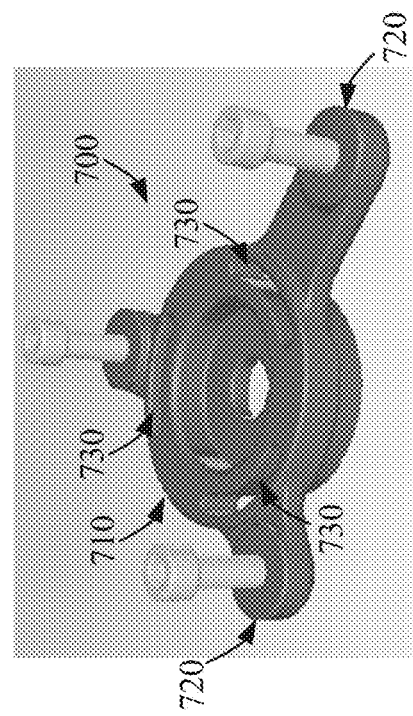
FIG. 9C is a perspective view of still another implementation of a mounting area for an exhaust elbow component having openings through the boss.

FIGS. 9A-9C depict various other implementations of mounting areas for an exhaust elbow component. FIG. 9A depicts an implementation of a mounting area 500 for an exhaust elbow component. The mounting area 500 includes a boss 510 and one or more mounting legs 520. The boss 510 includes an opening 512 through which reductant may be dosed into the internal cavity and interior chamber of the exhaust elbow component from an injection tip of a dosing module. In some implementations, the opening 512 may be positioned such that the injection tip of the dosing module extends through the opening 512 and into the internal cavity. In other implementations, the opening 512 may be positioned such that the injection tip of the dosing module is substantially aligned with a surface surrounding the opening 512, such as an interior or exterior surface surrounding the opening 512. In still other implementations, the opening 512 may be positioned such that the injection tip of the dosing module is positioned outside of the opening 512 and sprays reductant through the opening 512.

The boss 510 also includes a body portion 514 that abuts a portion of the dosing module to accommodate, seal, and support the positioning of the injection tip of the dosing module relative to the opening 512. In the implementation shown, the body portion 514 includes a cylindrical protrusion with a hollow interior to accommodate the positioning of the injection tip of the dosing module relative to the opening 512. In other implementations, the body portion 514 may have other configurations (e.g., square, triangular, hexagonal, pentagonal, etc.). When the dosing module is coupled to the mounting area 500, the abutment of the body portion 514 of the boss 510 to the dosing module may form a fluid seal to substantially prevent exhaust gas and/or reductant within the exhaust elbow component from escaping to atmosphere. In some implementations, a gasket or other seal may be interposed between the dosing module and the body portion 514.

The mounting area 500 also includes one or more mounting legs 520. The mounting legs 520 extend from the body portion 514 of the boss 510. In the implementation shown, three mounting legs 520 extend from the boss 510 to attach to three mounting points of a dosing module. In other implementations, more than three or less than three mounting legs 520 may extend from the boss 510 to attach respective mounting points of the dosing module. The mounting legs 520 include a leg body portion 522 and a mounting portion 524. The leg body portion 522 of each mounting leg 520 has a substantially rectangular cross-section. In some implementations, the exterior sides of each leg body portion 522 may taper from a first end extending from the boss 510 toward a second end where the mounting portion 524 is located. The mounting portion 524 is a cylindrical member having an attachment opening 526 formed therethrough. The attachment opening 526 is sized to permit an attachment member 550, such as a bolt, to extend through the mounting portion 526 to couple the dosing module to the mounting area 500. In other implementations, the mounting portion 524 may be a square member, a rectangular member, a hexagonal member, a pentagonal member, an oval member, etc.

Each of the mounting legs 520 include an openings 530 formed through a portion of the mounting leg 520. In the implementation shown, the openings 530 are arcuate slots formed through a respective mounting leg 520 substantially near the body portion 514 of the boss 510. The openings 530 increase the surface area of the mounting leg 520 that is exposed to the atmosphere, thereby increasing the convective cooling of the mounting area 500 and, consequently, the dosing module attached to the mounting area 500. The openings 530 may also help to reduce the conduction heat transfer from the exterior wall 208 to the mounting area 500. The openings 530 may reduce the temperature of the mounting legs 520 by approximately 7% to 8% compared to a design omitting the openings 530, as shown in FIG. 9B.

FIG. 9B depicts another implementation of a mounting area 600 for an exhaust elbow component. The mounting area 600 includes a boss 610 and one or more mounting legs 620. The mounting area 600 is configured in a substantially similar manner to the mounting area 500 of FIG. 9A, except the mounting area 600 excludes the openings 530 in the mounting legs.

FIG. 9C depicts yet another implementation of a mounting area 700 for an exhaust elbow component. The mounting area 700 includes a boss 710 and one or more mounting legs 720. The mounting area 700 is configured in a substantially similar manner to the mounting area 500 of FIG. 9A, except the mounting area 700 excludes the openings 530 in the mounting legs. Instead, the mounting area 700 includes one or more openings 730 formed through a portion of the boss 710. In the implementation shown, the openings 730 are arcuate slots formed through the boss 710 and are equally arcuately spaced about the boss 710. The openings 730 increase the surface area of the boss 710 that is exposed to the atmosphere, thereby increasing the convective cooling of the mounting area 700 and, consequently, the dosing module attached to the mounting area 700. The openings 730 may reduce the temperature of the boss 710 by approximately 8% to 14% compared to a design omitting the openings 730, as shown in FIG. 9B.

In some implementations, the one or more features of the foregoing mounting areas, 220, 500, 600, 700 may be combined with any of the other features of the other mounting areas 220, 500, 600, 700. For instance, the openings 730 of mounting area 700 through the boss 710 may be implemented with the openings 530 formed through the mounting legs 520 of the mounting area 500 to further increase the surface area of the resulting mounting area that is exposed to atmosphere, thereby further enhancing the convective cooling of the mounting area. In another implementation, the openings 530 and/or 730 may be implemented with the mounting area 220 having T-shaped cross-sections for the mounting legs 240.

Figure 10:
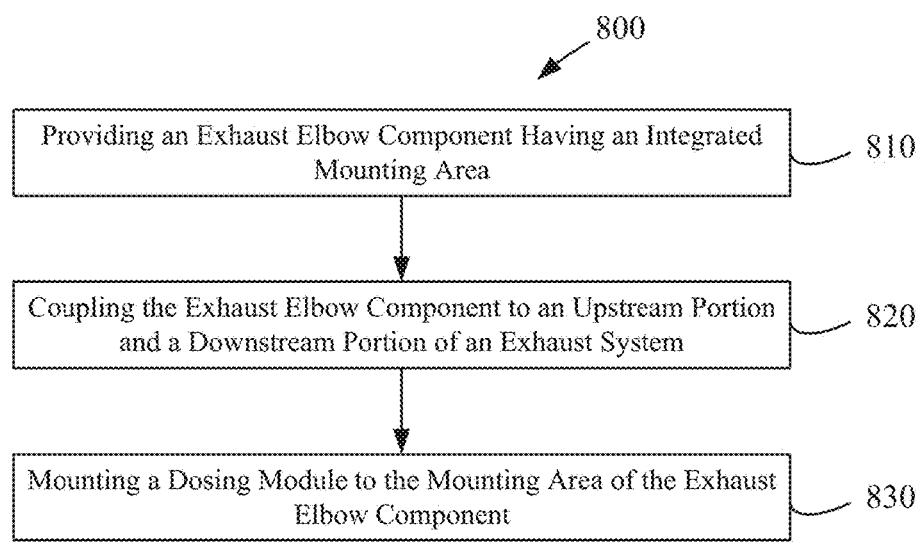
FIG. 10 is a block diagram of an example method of manufacture for assembling an exhaust system with an exhaust elbow component having a mounting area for a dosing module.

FIG. 10 is process 800 for manufacturing and/or assembling an exhaust system with an exhaust elbow component having a mounting area for a dosing module. The process 800 includes providing an exhaust elbow component having an integrated mounting area (block 810). The exhaust elbow component may be the exhaust elbow component 200 described in reference to FIGS. 2-7. The exhaust elbow component includes a mounting area, such as mounting area 220, 500, 600, 700, for mounting a dosing module 112 to the exhaust elbow component. The mounting area 220, 500, 600, 700 includes a boss 230, 510, 610, 710 and one or more mounting legs 240, 520, 620, 720.

The process 800 further includes coupling the provided exhaust elbow component to an upstream portion 420 and a downstream portion 430 of an exhaust system (block 820). In some implementations, the exhaust gas inlet of the exhaust elbow component may be fluidly coupled to an upstream portion 420 of the exhaust system, such as via inserting a portion of the exhaust elbow component into the upstream portion 420 of the exhaust system and/or inserting a portion of the upstream portion 420 of the exhaust system into a portion of the exhaust elbow component. In some implementations, the exhaust gas inlet of the exhaust elbow component may be welded to the upstream portion 420 of the exhaust system. In other implementations, the exhaust gas inlet of the exhaust elbow component may be bolted to the upstream portion of the exhaust system. In further implementations, the upstream portion 420 of the exhaust system may be press fit onto or into the exhaust gas inlet of the exhaust elbow component.

The exhaust gas outlet of the exhaust elbow component may be fluidly coupled to the downstream portion 430 of the exhaust system, such as via inserting a portion of the exhaust elbow component into the downstream portion 430 of the exhaust system and/or inserting a portion of the downstream portion 430 of the exhaust system into a portion of the exhaust elbow component. In some implementations, the exhaust gas outlet of the exhaust elbow component may be welded to the downstream portion 430 of the exhaust system. In other implementations, the exhaust gas outlet of the exhaust elbow component may be bolted to the downstream portion 430 of the exhaust system. In further implementations, the downstream portion 430 of the exhaust system may be press fit onto or into the exhaust gas outlet of the exhaust elbow component.

The process 800 may further include mounting a dosing module to the mounting area of the exhaust elbow component (block 830). For instance, the dosing module may be bolted, strapped, welded, and/or otherwise coupled to one or more mounting legs 240, 520, 620, 720 of the mounting area 220, 500, 600, 700 of the exhaust elbow component such that the dosing module may dose reductant into the exhaust elbow component.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

As utilized herein, the term "substantially" and any similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided unless otherwise noted. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An exhaust elbow component, comprising:
   an exhaust gas inlet configured to receive exhaust gases;
   an exhaust gas outlet angularly offset from the exhaust gas inlet; and
   an exterior wall having a curvature and defining an interior chamber, the exterior wall connecting the exhaust gas inlet and the exhaust gas outlet, the exterior wall including a semi-conic protrusion extending outwardly from the curvature of the exterior wall so as to define an internal cavity, a width of the exhaust elbow along an entirety of the semi-conic protrusion being greater than a width of the exhaust elbow upstream and downstream of the semi-conic protrusion, the exterior wall being configured to redirect exhaust gases from the exhaust gas inlet to the exhaust gas outlet, the exterior wall further including a mounting area for mounting a doser on at least a portion of the protrusion, the mounting area comprising:
   a boss having an opening through which reductant is dosed when the doser is mounted to the mounting area, a central axis of the opening coaxial with a central axis of the exhaust gas outlet, and
   one or more mounting legs each having a surface area for convective cooling of the one or more mounting legs, the one or more mounting legs spaced apart from the exterior wall and extending from the boss.

2. The exhaust elbow component of claim 1, wherein the exterior wall further defines the internal cavity having an end, wherein the mounting area is located at the end of the internal cavity.

3. The exhaust elbow component of claim 2, wherein the internal cavity is defined by a semi-conic protrusion of the exterior wall.

4. The exhaust elbow component of claim 2, wherein the internal cavity is configured to reduce exhaust gas recirculation at an injection tip of the doser.

5. The exhaust elbow component of claim 1, wherein the one or more mounting legs each have a first end and a second end, wherein the one or more mounting legs each extend from the boss at a respective first end, and wherein the one or more mounting legs each have a mounting portion at the second end.

6. The exhaust elbow component of claim 5, wherein the one or more mounting legs each have a leg body portion having a T-shaped cross-section extending from the respective first end to the respective mounting portion at the second end.

7. The exhaust elbow component of claim 6, wherein the respective leg body portion comprises an upper portion, wherein a side of the upper portion tapers from the respective first end to the second end.

8. The exhaust elbow component of claim 6, wherein the respective leg body portion comprises a rib portion, wherein the rib portion tapers from the respective first end to the second end.

9. The exhaust elbow component of claim 1 further comprising an insulating material or heat shield disposed about a portion of the exterior wall.

10. The exhaust elbow component of claim 9, wherein the insulating material or heat shield is positioned between the exterior wall and the one or more mounting legs of the mounting area.

11. The exhaust elbow component of claim 1, wherein the exterior wall and the mounting area are formed of a single homogeneous continuum of material.

12. The exhaust elbow component of claim 1, wherein the exterior wall and the mounting area are a cast component.

13. The exhaust elbow component of claim 12, wherein the cast component is cast stainless steel.

14. The exhaust elbow component of claim 1, wherein the exhaust gas outlet is angularly offset from the exhaust gas inlet by ninety degrees.

15. An exhaust system, comprising:
    a decomposition chamber; and
    an exhaust elbow component having an exhaust gas outlet, an exhaust gas inlet, and a curvature, the exhaust gas outlet in fluid communication with the decomposition chamber, the exhaust gas inlet receiving exhaust gases, the exhaust elbow component comprising:
    an exterior wall defining an interior chamber and connecting the exhaust gas inlet and the exhaust gas outlet, the exterior wall including a protrusion extending outwardly from the exterior wall defined by the curvature of the exhaust elbow component so as to define an internal cavity, a width of the exhaust elbow component along an entirety of the protrusion being greater than a width of the exhaust elbow component downstream of the protrusion, the exterior wall being configured to redirect exhaust gases from the exhaust gas inlet to the exhaust gas outlet, the exterior wall further including a mounting area for mounting a doser on at least a portion of the protrusion, the mounting area comprising:
    an opening through which reductant is dosed when the doser is mounted to the mounting area, a central axis of the opening coaxial with a central axis of the exhaust gas outlet, and
    one or more mounting legs each having a surface area for convective cooling of the one or more mounting legs.

16. The exhaust system of claim 15, wherein the mounting area comprises a boss through which the opening extends.

17. The exhaust system of claim 16, wherein the boss comprises one or more additional boss openings formed through a respective portion of the boss to convectively cool the boss.

18. The exhaust system of claim 15, wherein the one or more mounting legs comprise one or more leg openings formed through a leg body portion of a respective mounting leg of the one or more mounting legs to convectively cool the respective mounting leg.

19. The exhaust system of claim 15, wherein the exterior wall further defines the internal cavity having an end, wherein the mounting area is located at an end of the internal cavity, and wherein the internal cavity is configured to reduce exhaust gas recirculation at the injection tip of the doser.

20. A process for assembling an exhaust system, comprising:
    providing an exhaust elbow component, the exhaust elbow component comprising:
    an exhaust gas inlet configured to receive exhaust gases from an upstream portion of an exhaust system,
    an exhaust gas outlet angularly offset from the exhaust gas inlet, and an exterior wall having a curvature and defining an interior chamber, the exterior wall connecting the exhaust gas inlet and the exhaust gas outlet, the exterior wall including a semi-conic protrusion extending outwardly from the curvature of the exterior wall so as to define an internal cavity, a width of the exhaust elbow component along an entirety of the semi-conic protrusion being greater than a width of the exhaust elbow component downstream of the semi-conic protrusion, the exterior wall being configured to redirect exhaust gases from the exhaust gas inlet to the exhaust gas outlet, the exterior wall further including a mounting area for mounting a doser on at least a portion of the protrusion, the mounting area comprising:

a boss having an opening through the exterior wall through which reductant is dosed when the doser is mounted to the mounting area, a central axis of the opening coaxial with a central axis of the exhaust gas outlet, and one or more mounting legs configured to be coupled to the doser;

coupling the exhaust elbow component to the upstream portion and a downstream portion of the exhaust system; and mounting the doser to the mounting area of the exhaust elbow component.

\* \* \* \* \*